United States Patent

[11] 3,631,429

[72] Inventor Wayne J. King
Leucadia, Calif.

[21] Appl. No. 847,831
[22] Filed Aug. 6, 1969
[45] Patented Dec. 28, 1971
[73] Assignee Pacific Micronetics, Inc.
San Diego, Calif.
Continuation-in-part of application Ser. No. 805,916, Nov. 19, 1968. This application Aug. 6, 1969, Ser. No. 847,831

[54] SYSTEM FOR REPRODUCIBLY STORING DIGITAL DATA

16 Claims, 7 Drawing Figs.

[52] U.S. Cl. .......... 340/174.1 G, 340/174.1 H
[51] Int. Cl. .......... G11b 5/06
[50] Field of Search .......... 340/174.1 A, 174.1 G, 174.1 H, 174.1 B

[56] References Cited

UNITED STATES PATENTS 3,345,638 10/1967 Christol .......... 340/174.1 G
3,488,662 1/1970 Vallee .......... 340/174.1 G
3,508,228 4/1970 Bishop .......... 340/174.1 G

*Primary Examiner*—Bernard Konick
*Assistant Examiner*—Vincent P. Canney
*Attorney*—Smyth, Roston & Pavitt

ABSTRACT: A system is disclosed for recording digital data on a magnetic storage surface and in sequential bit frames thereof. A "zero" is recorded by placing a transition on but one of the two frame boundaries of a bit frame. A "one" is recorded by placing a transition on both boundaries or in the center of the frame. The selection of transition placement is made dependent upon an odd-even count of recorded "-zeros." Upon readback, the delay between sequential readback peaks may be about one, one and a half or two frame periods, and the data are reconstructed from these delays in that a delay of a frame period represents a one, a delay of two frame periods represents two "zeros," and a delay of one and a half frame periods is alternatingly interpreted as a "zero," followed by a "one," or as a single "zero." Bit crowding and signal rise time problems are counteracted by predistorting the placement of transitions during recording.

INVENTOR
Wayne J. King
By Smyth, Roston & Pavitt
ATTORNEYS

Patented Dec. 28, 1971 3,631,429

4 Sheets-Sheet 2

INVENTOR:
Wayne J. King
By Smyth, Roston & Pavitt
ATTORNEYS

Patented Dec. 28, 1971 3,631,429

4 Sheets-Sheet 3

INVENTOR:
Wayne J. King
By Smyth, Roston & Pavitt
ATTORNEYS

INVENTOR:
Wayne J. King

By Smyth, Roston & Pavitt
ATTORNEYS

SYSTEM FOR REPRODUCIBLY STORING DIGITAL DATA

This is a continuation-in-part of application Ser. No. 805,916 filed Nov. 19, 1968 by Wayne J. King for a Quarter-half Cycle Coding For Rotating Magnetic Memory System.

The present invention relates to a system for storing digital data such as recording and reproducing digital data in a particular format on a track. While there is no reason to impose restrictions on the type of recording surface to be used for storing the digital data in the format as disclosed in this specification, a hard magnetic surface, such as disc or drum, is the preferred type of storage carrier. Discs are employed today as carrier for storing data for fast though nonrandom access and at a rather high package density; however, problems related to resolution have arisen as bit values are more difficult to distinguish during readback if the data is densely "-packed."

Among the recording formats for storing digital data in a self-clocking format, the most commonly used today are the frequency doubling and Manchester formats. The Manchester recording format can be regarded as a phase modulated system wherein a flux change occurs always at the center of each bit frame. Since convention adopted concerning direction is arbitrary, it may be assumed that a positive flux change will designate a "one," and a negative flux change will designate a "zero." The readback of the recorded pulses involves detecting the written signal polarity at a specific time within each bit frame. The system is readily adaptable to self-clocking as there is a transition for each bit. Additional transitions have to be provided in the bit frame boundary to establish the right polarity for the bit value defining transition in the center of the frame.

The frequency-doubling method operates in that there is always a flux reversal on each bit frame boundary, and an additional reversal is placed in the center of the bit frame, for example, if the bit has the value "one." The two formats have in common that there is at least one transition and a corresponding signal readout peak (but no more than two) for each bit. Depending on the format, a transition occurs in the center or on the boundaries of each bit frame, and additional transitions are provided (respectively on boundaries or the center) in order to define or establish bit values. Alternate readback peaks have, of course, opposite polarity.

The recording can be interpreted such that two sequential transitions in opposite directions are produced by a half-wave of a recording signal, and the transitions mark the phase points of polarity change thereof. The frequency spectrum used for recording signals in that interpretation includes a spatial cycle frequency of *half* the frame rate. This frequency can be regarded as bit-rate-defining fundamental. Selectively superimposed upon this fundamental is a spatial cycle frequency equal to the frame rate itself for bit value definition. During readback, each transition produces a signal peak and detection of recorded signal frequencies, therefore, involves the detection of the timing between sequential readback signal peaks. Two sequential readback peaks establish or reconstitute the timing of a half-wave of the recorded signals at any frequency. These peaks recur either at the bit frame rate or at twice the bit frame frequency, respectively in representation of a half-wave of half-frame rate frequency or of a half-wave of full frame rate frequency.

For high package densities the signal frequencies encountered in such a system are rather high. Inherent delays in the magnetic interaction processes involved produce peak displacements such that the information-bearing spatial distribution pattern of the transitions is not adequately reproducible any more as corresponding timing pattern of occurrence of readback peaks. It is, therefore, desirable to use a different type format, requiring less transitions, but which, however, is still self-clocking.

The recording and reproduce system, in accordance with the present invention, therefore, operates on basis of the following principles. It is suggested to record an even numbered sequence of similar digits having a first value by placing transitions at a two-bit frame spacing for each two such digits which is equivalent to a half-wave for recording signal frequency of one-quarter bit frame frequency.

Sequences of similar digits having second value are recorded by placing transitions at frame rate corresponding to a recording frequency equal to one-half bit frame frequency and at a phase in relation to sequential bit frames, depending upon whether or not a preceding sequence of digits of the first value terminated with a complete half-wave of the quarter-bit frame frequency.

In dependence upon the number of digits of first and second values, half-waves of quarter and half-bit frame frequency may follow phase coherently with frequency changes occurring only on bit frame boundaries. However, a pair of dissimilar digits is recorded by a half-wave having ⅓-bit frame rate if (1) the first digit of the pair has the first value, and the immediately preceding digit (or digits) was (were) recorded as part of a signal wave phase coherent with and terminating at a frame boundary or if (2) the first digit of the pair has the second value and the signal wave for the first digit terminates at a midframe point, for reason of a preceding case (1).

From a different point view and to give a specific example, the recording format can be described as follows: As a prerequisite it is assumed that it can be established at any instant whether, from an arbitrarily chosen beginning, the total number of, for example, "zeros" previously recorded (contiguously or not) is odd or even. The recording itself is then made under observation of these rules: Record a half-wave of quarter-bit frame rate frequency for two sequential "zeros" on an even count of zeros recorded previously, but always for two out of three immediately succeeding zeros; record a half-wave of ⅓-bit frame rate frequency for two dissimilar bits if during the second frame involved for recording the two bits the prior "zero" count establishes an odd zero count; record a half-wave of half-bit frame rate frequency for two "ones" in case of an odd count of prior zero recording and for a single "one" in case of an even prior zero count.

The detection and decoding of recordings made in this format (also called QHC format) involves the detection of the time of occurrence of a reproduced transition relative to a previous one. The delay may be approximately a full, one and one-half or two-bit frame periods, commensurate with the detection of a recorded half-wave of high, middle or low frequency. Detection of a low-frequency component and of every other middle-frequency component are respectively interpreted as digits of the first value. Detection of a high-frequency component and of the respective interspaced middle-frequency components (whenever occurring) are interpreted as digits of the second value. For each of the latter-type middle-frequency components as well as for each low-frequency component an additional digit of the first value is synthetized prior to decoding of these components themselves.

The format chosen has these advantages. There is no signal wavelength shorter than two frames, i.e., the highest frequency is *half* the bit frame frequency. The format is still self-clocking as there is at least one transition per two-digit frames. The record can be read unambiguous in both directions and with the same equipment. During readback the system resynchronizes and is partially self-correcting in case of a read error (one readback peak too many or one less) so that only part of the data may be incorrect, as the phase of the highest recorded signal frequency relative to the frame boundaries has no digital significance. An error such as a missed readback pulse can propagate into the data only up to the next complete half-wave of the lowest (quarter-bit frame) frequency.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 2, 2A:
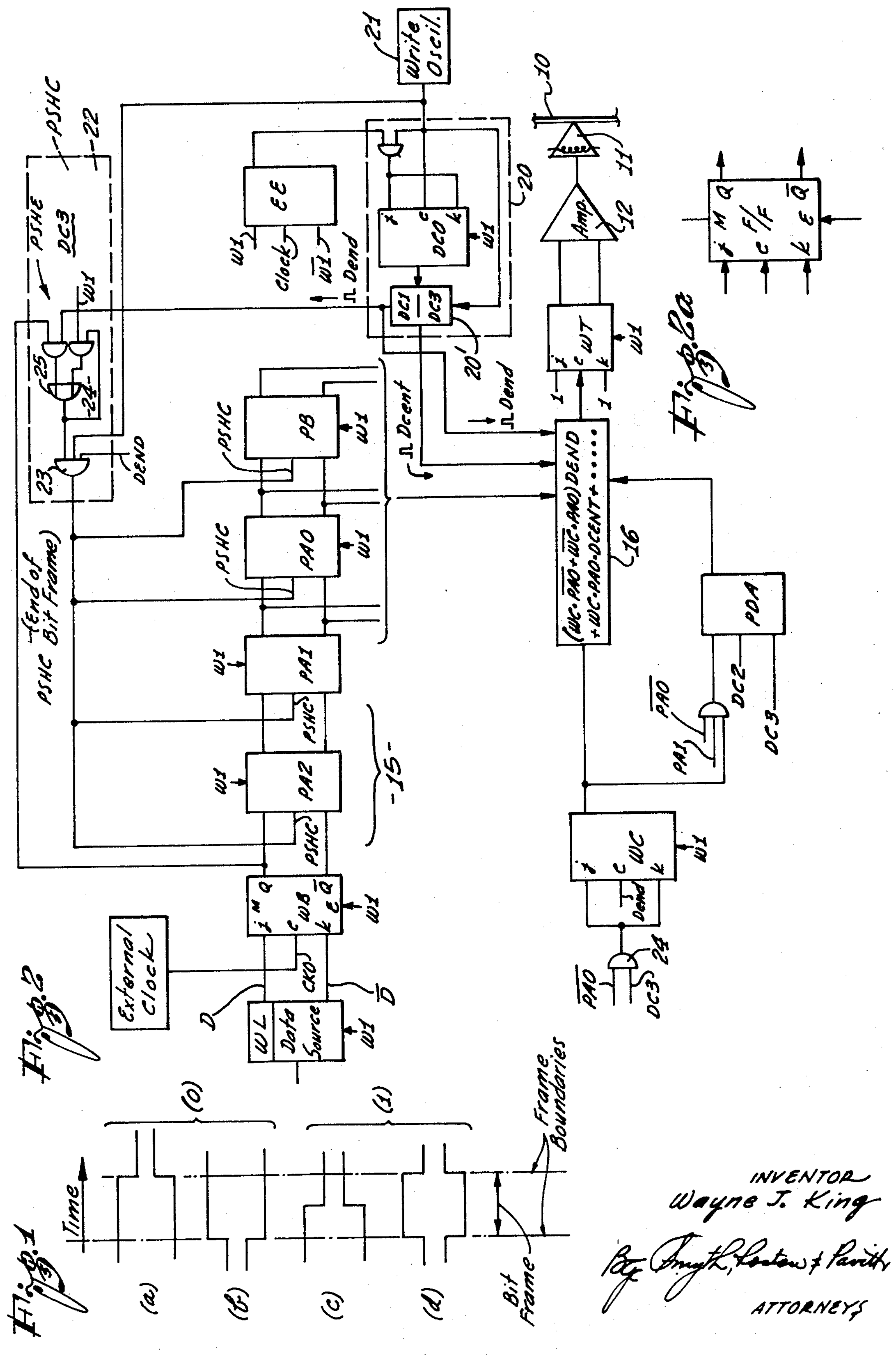
FIG. 1 illustrates the waveform pattern for recording digital data in accordance with the present invention.
FIG. 2 illustrates block and circuit diagram for the record control logic to provide digital recording using the format in accordance with the present invention.
Figure 3:
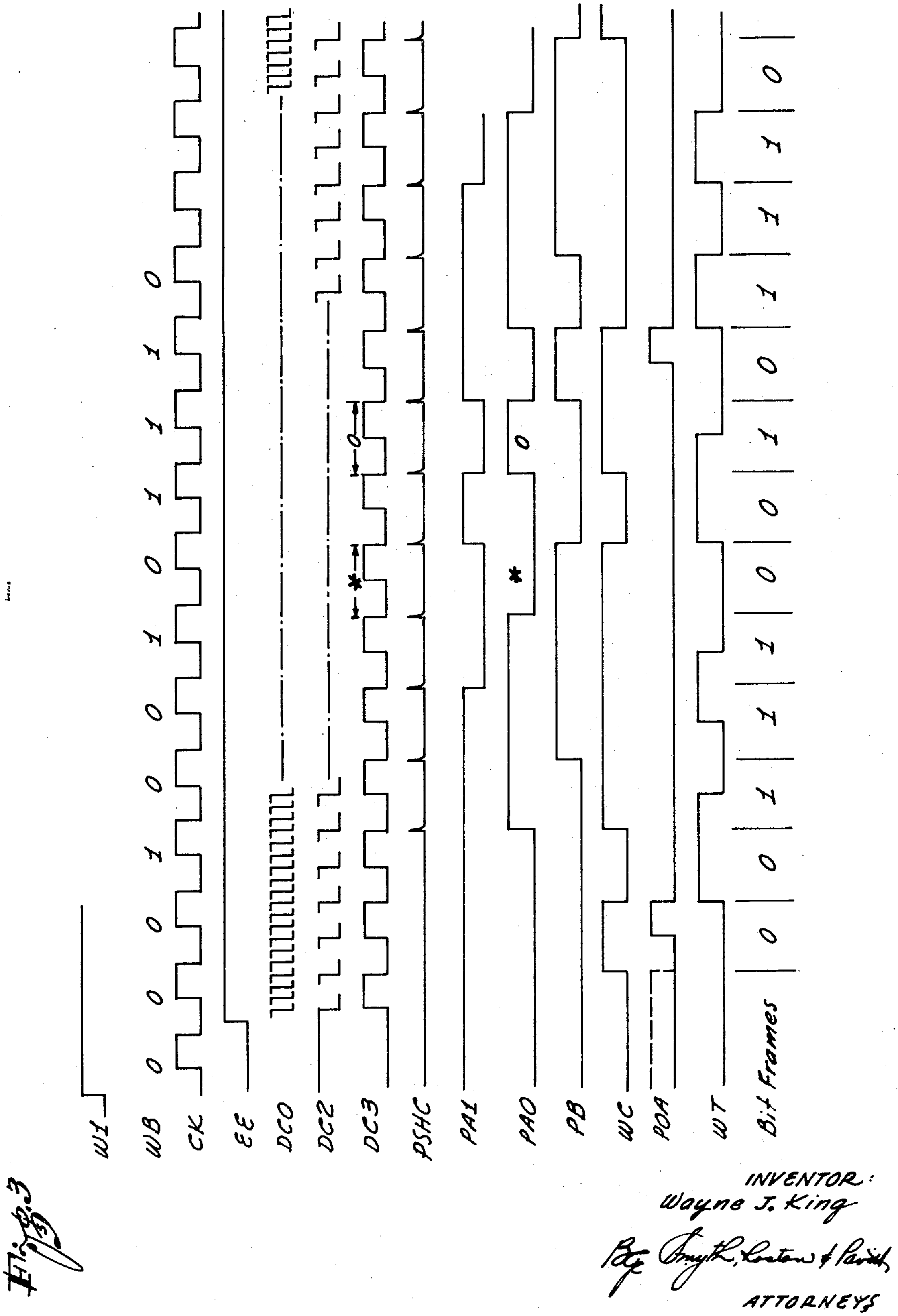
Figures 4, 4A:
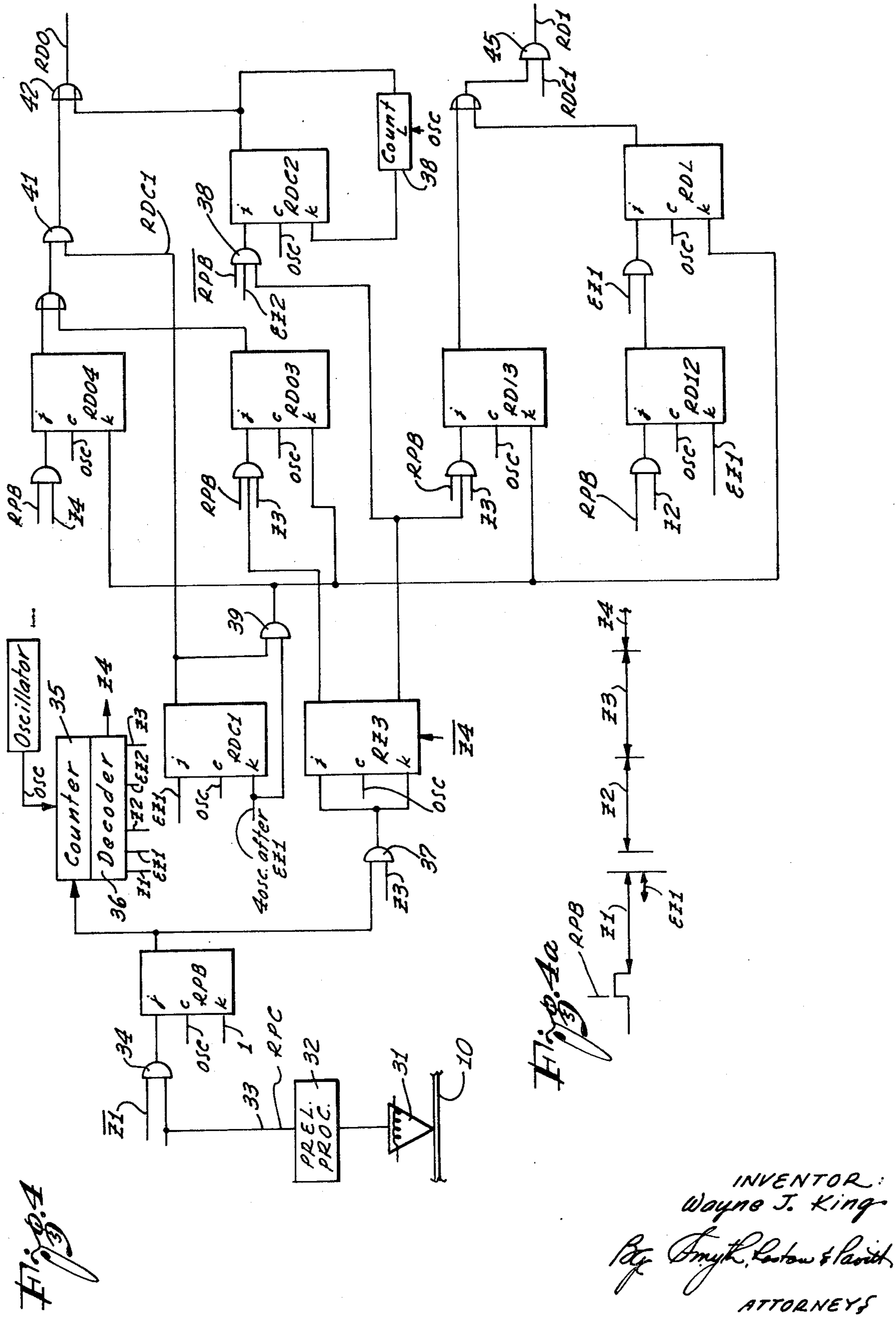
Figure 5:
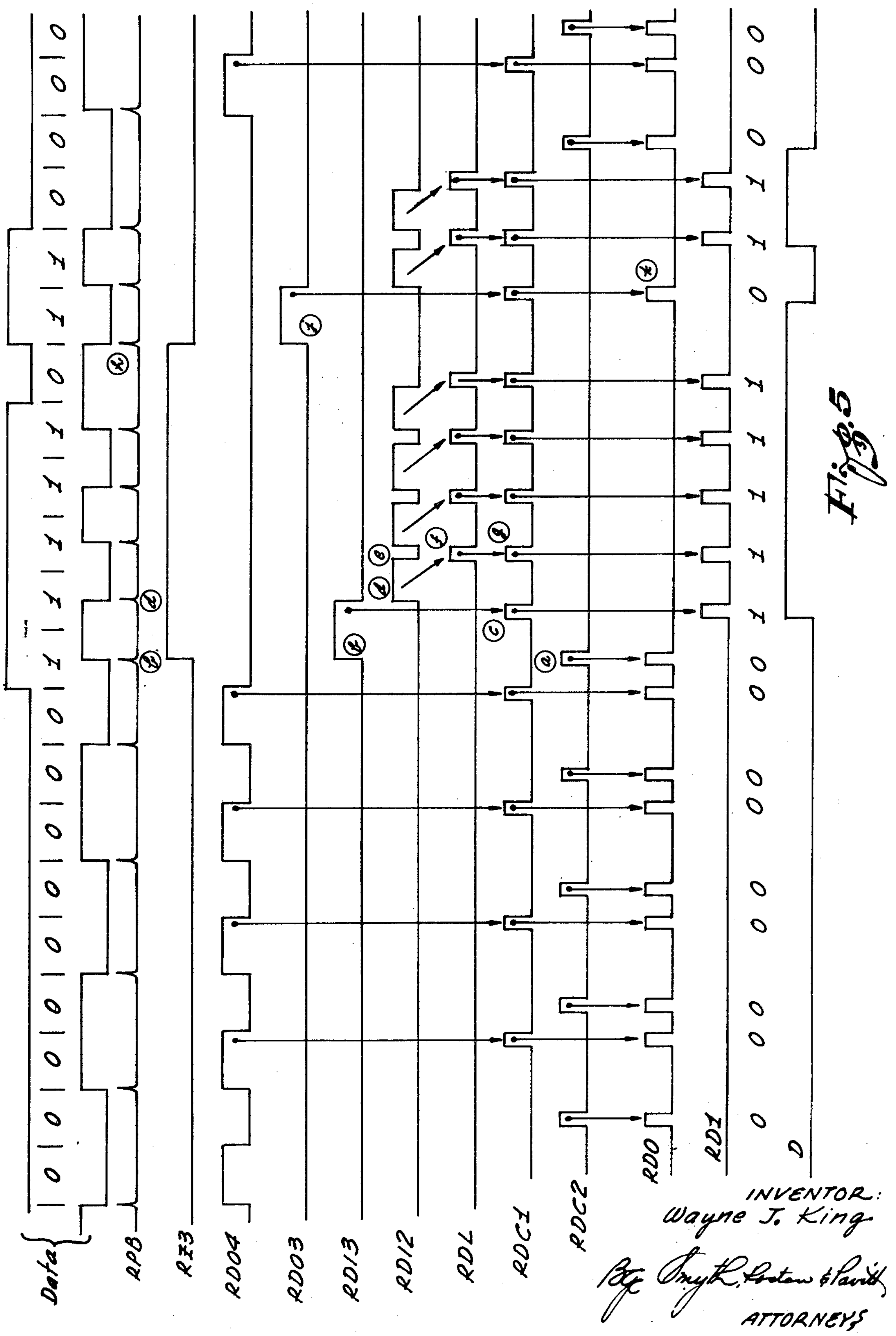

FIG. 2*a* illustrates schematically inputs and outputs for flip-flops used in the several circuits illustrated;

FIG. 3 illustrates a waveform pattern in several lines for signals as developed in the circuit shown in FIG. 2;

FIG. 4 illustrates a block diagram for the readout signal processing circuit for decoding reproduced signals to reconstitute the digital data represented by the recording in a format provided with the circuit shown in FIG. 2;

FIG. 4*a* illustrates schematically certain time zones relevant in the circuit shown in FIG. 4; and FIG. 5 illustrates a timing and waveform diagram of representative signals developed in the circuit shown in FIG. 4.

Proceeding now to the detailed description of the drawings, in FIG. 1 thereof, there is illustrated the magnetization waveforms used for recording digital data in the QHC-encoded format. It was mentioned above that as a general rule the method employs the use of a signal frequency for recording, for example, sequential zeros, and of half the bit frame frequency for recording sequential ones (the association could be reversed and it is merely a matter of convenience to explain the invention on the basis of this association between waveforms and bit values). Accordingly, a pair of sequential zeros is recorded by recording two oppositely directed transitions at a spacing of twice the bit frame width as the equivalent of a half-wave of a frequency of a quarter-bit frame frequency.

It follows that a single "zero" can be recorded by placing a single transition in relation to two-bit frame boundaries, as shown in FIGS. 1*a* or 1*b*, i.e., at the end or at the beginning of a bit frame allotted for recording a particular bit presumed to have value zero. The magnetic flux direction itself is of no bit-defining significance. Hence, there are four possibilities for recording a bit value "zero"; two patterns or possibilities for recording a transition at the leading bit frame boundary and two patterns for recording a transition at the lagging bit frame boundary.

It can be assumed for the sake of convenience, that in a recording sequence a particular number of zeros is recorded first with the very first zero being recorded by placing a transition in the leading bit frame boundary (FIG. 1*b*). It follows that after an even number of recorded zeros there is a transition of the trailing bit frame boundary (FIG. 1*a*). This is mentioned here because it demonstrates that by an odd-even count of recorded "zeros" a particular correlation between recorded frequencies and half-wave pattern on one hand, and bit values, on the other hand, can be established. Assuming, furthermore, that the first zero on a track is recorded by a leading boundary transition (FIG. 16), it follows that an even number of zeros (including the first zero) is represented by half that number of half-waves of quarter-bit frame signal frequency, phase coherent with the frame boundary pattern.

For recording a "one," half-bit of the patterns shown in FIGS. 1*c* and 1*d* is to be used. The selection is governed by the following rules. If a half-wave of quarter-bit frame frequency commensurate with two zeros after recording an even number of zeros is followed by a "one" or several thereof, one (or several) half-waves of half-bit frame frequency are recorded phase coherently therewith, as well as with the bit frame boundaries. In such a situation, a "one" (and each directly succeeding "one") will be recorded as shown in FIG. 1*d*.

If an odd number of "zeros" is followed by a "one" the last "zero" was recorded by a transition on its leading frame boundary, so that there is no transition at the beginning of the frame which is to hold a "one." In this situation, the pattern as shown in FIG. 1*c* is to be used for recording a one, as well as for all immediately succeeding "ones," to thereby maintain the frequency relation of sequential "ones" in accordance with the basic rules. Hence, a distortion in pattern of recorded waves occurs commensurate with a phase shift of half a bit frame period. As a consequence, such zero-one pattern is recorded by a half-wave of ⅛-bit frame frequency. Therefore, if, in the assumed situation, an odd number of "zeros" is followed by several ones, a phase shift in the corresponding wave pattern of half-bit frame period is introduced up to the next "-zero."

It follows from the foregoing that the selection of the recording pattern, between the two available in accordance with FIG. 1*d* or FIG. 1*c* and to be used for recording a one, will not only depend on whether the number of immediately preceding zeros is odd or even, but whether the total number of zeros as recorded previously is odd or even, because a "one" after *any* odd number of "zeros" introduces this phase shift (pattern 1*c*) and the next zero (evening out the number of recorded zeros) brings the recording pattern back to phase coherently with the bit frame boundaries.

The consequences of the particular pattern and format used, and the rules governing the selection at any instant will become apparent more fully below. After these preliminary remarks concerning the nature of the recording we will proceed to the description of the write control circuit.

Turning first to FIG. 2*a*, there is illustrated symbolically the type of flip-flop used throughout the system. The flip-flop is of the so-called JK type, i.e., it resolves the conflict between concurring set and reset inputs by changing states. The flip-flop has a set signal input called J input and a reset input called the K input. Depending upon input signals applied to J and K inputs, the flip-flop sets, resets or changes state at the failing edge of a clock signal applied to the clock terminal C of the flip-flop.

In addition, the flip-flop has two inputs sometimes called "-direct set" and "direct reset" but presently we adopt the common designations, "mark" and "erase." These inputs correspond to inputs used for simple latches for causing the flip-flop to set or reset independent from the clock. In particular, the flip-flop is forced to set if the input signal applied to the MARK input terminal M turns false and asynchronous to the clock operation. The flip-flop can reset subsequently by a clocked K-input only if the M-input signal is true. Analogously, if the logic input signal applied to the ERASE input terminal E turns from true to false, the flip-flop resets independently from the clock. The flip-flop can be set subsequently by a clocked J-input, only if the E-input signal is true. Q and $\bar{Q}$, of course, are the conventional set and reset output terminals for the flip-flop, with Q=1 defining the set state, $\bar{Q}$=1 defining the reset state.

Turning now to FIG. 2, the essential object is to write a digital data-recording track in the QHC format on a magnetic storage carrier 10 of the hard surface type, for example, a disc. The recording proper is carried out by a conventional transducer 11, providing magnetization in one or the opposite direction across its gap, and in accordance with the direction of the output current of a bidirectionally operating amplifier 12. Amplifier 12 is under control of a write flip-flop WT to provide magnetization current in one direction if WT flip-flop is in the set state, and in the opposite direction if it is in the reset state. When flip-flop WT changes state, a transition or flux reversal is recorded on the storage carrier. The circuit to be described next controls the state of flip-flop WT.

Flip-flop WT is controlled as a toggle flip-flop in that its J and K inputs are permanently biased true. The inputs are designated "1" as logic representation for the input voltages applied permanently in representation of the "true" state. The control proper of flip-flop WT thus involves the development of appropriate clock signals. This control circuit includes a digital data input section 15 comprised of five flip-flops WB, PA2, PA1, PA0 and PB, interconnected to form a shift register. A clock gate circuit 16 provides the clocking pulses for the write flip-flop WT by logically processing the content of flip-flop PA0 and others.

A bit frame counter 20 is provided FOR counting out relevant periods of time for the write control operation, and here particularly for making available appropriate timing signals for clocking flip-flop WT. The principal input for counter 20 is an oscillator 21 serving also as an input for a data pulse shift clock control circuit 22, which, in turn, provides shift clock pulses PSHC for shift register 15. The shift clock is timed by counter 20 such that the pulses PSHC occur at the end of each bit frame period. The control circuit for write flip-flop WT includes further a control or pattern select flip-flop WC, the function of which is to select at any instant the particular recording pattern to be used. In particular the flip-flop WC counts the number of zeros recorded on a modulo-two basis, i.e., the flip-flop WC is reset for an even number of zeros and set for an odd number of zeros yet recorded.

The circuit, furthermore, includes an enabling flip-flop EE which is set and remains in the set state as long as a write operation is required. The flip-flop controls, in particular, the operation of the bit frame metering counter 20. A flip-flop PDA is provided for a particular refinement operation having to do with the compensation of bit crowding and rise time adaptation of the circuit to be described more fully below.

Finally, the circuit is shown as including a flip-flop WL, which can be regarded as a general source of digital data. Within the digital system of which the write control circuit is but a part, element WL is, in fact, a flip-flop into which data is set from an external source such as, for example, an output channel of a computer. Surface 10 can be assumed as serving as a computer memory extension, and the flip-flop WL is the device into which the computer feeds data intended to be recorded on surface 10.

It is assumed that the circuit external external the illustrated circuit includes a clock providing clock pulses CK which represents phase and rate with which the computer provides data. That clock is thus also representative of phase and rate with which data *can* be provided by source WL for recording. The frequency of these clock pulses CK must be equal to the frequency of recording data bits, the phase can differ. Generally it can be assumed that the recording control system enters into a dialog with the eternal source (computer) informing the source of the phases in which the system can accept data and the source (computer) provides data in response thereto for recording and accompanies them by clock pulses CK.

Proceeding now to particulars, data are provided for recording by the immediate source, flip-flop WL, having output channels D and $\overline{D}$, which provide true signals respectively for digital "ones" and digital "zeros." These data are set into write buffer flip-flop WB still at a rate and phase as determined by the clock pulse CK. Flip-flop WB serves as a buffer to synchronize the phase of operation as between clock pulses CK and the recording operation in general and the shift pulse PSHC in particular. The set and reset output terminals of buffer flip-flop WB are respectively connected to J and K terminals of flip-flop PA2 which can be regarded as a temporary buffer but which is instrumental in the formation of a preamble, a particular bit pattern is to precede the recording of data proper.

As stated, flip-flop WB, PA2, PA1, PA0 and PB form a shift register. Accordingly, the output of flip-flop PA2 is set into flip-flop PA1, the output of which is set into flip-flop PA0 and the output of the latter, in turn, is set into the flip-flop PB. It is assumed, i.e., the circuit is constructed such that at any instant the flip-flop PA0 holds the bit that is being recorded. Therefore, the flip-flop PB holds the previous bit, the flip-flop PA1 the next bit, and the flip-flop PA2 the bit thereafter.

Data are shifted through these flip-flops by the clock pulses PSHC occurring at the end of each bit frame period as metered by the circuit 20. The clock pulses PSHC, however, are not produced at all time but only in response to an initiated write operation and after a data bit of value "one" has been set into flip-flop WL and clocked into WB. The commencement of a write operation will be described later in the specification. The elements involved in the regular and normal operation will be described first.

The bit frame metering counter 20 includes a flip-flop DCO operated as a toggle flip-flop in that its J and K terminals receive a pulse and enabling signal as long as enabling flip-flop EE is set. As stated, oscillation signals OSCW are provided by oscillator 21, and it is assumed that counting of twelve pulses OSCW as provided by oscillator 21 establishes a bit frame period. Accordingly, the circuit 20 includes three additional flip-flops which are not shown individually, DC1, DC2 and DC3, but are summarily included in box 20'. The flip-flop DC0 operates as frequency divider for the oscillator pulses OSCW and controlling flip-flop DC1, DC2 and DC3. Briefly, the connections in box 20' are made in accordance with the following table as far as the flip-flops DC1, DC2 and DC3 are concerned.

| | | |
|---|---|---|
| J–DC1=1 | K–DC1=DC2 | C–DC1=DC0 |
| J–DC2=DC1 | K–DC2= | C–DC2=DC0 |
| J–DC3=DC2 | K–DC3=DC2 | C–DC3=DC0 |

The resulting pulses are plotted in FIG. 3.

As one can readily see, flip-flop DC3 is true for half a bit frame period, and false for the remaining half a bit frame period. It is assumed further that the false state of DC3 is the first half of a bit frame period and the true state of DC3 occurs at the second half of a bit frame period as metered by counting in the counter 20. The metering circuit 20, therefore, provides the following relevant signals which are gated out of the flip-flop DC0 through DC3, by means of gates included in box 20'.

A first one of these signals is called DEND and is logically defined as DC0·DC2·DC3. DEND is true for the last clock pulse and the respectively preceding clock pulse pause in each bit frame period. The falling edge of DEND marks the time of a bit frame boundary. As one can see from the output circuit of shift clock circuit 22, the gate 23 provides the shift clock pulses PSHC for the shift register circuit 15 at the end of each bit frame period (OSCW.DEND), there being an additional enabling signal to be explained below. Another relevant signal provided by metering circuit 20 is called DCENT defined as DC0·DC2·$\overline{\text{DC3}}$. DCENT is true at the end of the false state of flip-flop DC3. The falling edge of DCENT marks, therefore, the middle of a bit frame period.

The flip-flop WC is toggled through a gate 24 receiving the signals DC3 and $\overline{\text{PA0}}$ and enabling J and K inputs of flip-flop WC to render it receptive to a clock signal; the signal DEND is used as clock. Hence, flip-flop WC toggles each time flip-flop PA0 holds a zero but at the end of each bit frame period. If one assumes (and the assumption will be verified below) that after the first zero has been recorded, flip-flop WC is set, then it follows generally that flip-flop WC is in the set state *after* an odd number of "zeros" has been recorded and in the reset state *after* an even number of "zeros" has been recorded. This then establishes flip-flop WC as a modulo-two counter of zeros as recorded up to any instant.

For a simplified mode of recording, i.e., for a recording process which does not compensate for bit crowding nor for problems concerning the rise time of signals, the clock gate 16 realizes the following logic relation:

$$C\text{–}WT=(WC\cdot\overline{PAO}+\overline{WC}\ PAO)\cdot DEND+WC\cdot PAO\cdot DCENT$$

This signal serves as clocking signal for write flip-flop WT. Accordingly, flip-flop WT is toggled at the end of a bit frame period in some instances (DEND) and in the middle of a bit frame period in other instances (DCENT). It will now be explained that recording of digital data in the contemplated QHC format results indeed from such operation control of flip-flop and write transducer. An example for the recording of data and the resulting waveforms in the circuit is plotted in FIG. 3; this figure should be consulted for understanding the operation of the circuit as described.

First it shall be assumed that a zero is held in flip-flop PA0 ($\overline{\text{PAO}}$ 1) during a particular bit frame period, and that an odd number of zeros has been recorded previously (excluding the one held in PA0), so that pattern select flip-flop WC is in the set state. This situation occurs, for example, during the period marked (*) in FIG. 3. In accordance with the relation given above the clocking signal C—WT for flip-flop WT turns true at the end of the particular bit frame period as WC·$\overline{\text{PA0}}$·DEND is then true. Hence, flip-flop WT changes state and a transition is produced on the record carrier. Concurrently thereto, i.e., at the end of the same bit frame pattern select flip-flop WC is reset as now an even number of zeros has been recorded.

It is now assumed that the next bit held in PA0 is also a zero. In accordance with the relation given above, $\overline{\text{PA0}}$ does not cause production of a clock pulse during C—WT when $\overline{\text{WC}}$=1. Therefore, at the end of a bit period during which a zero is held in flip-flop PA0, and after an even number of zeros has been recorded, write flip-flop WT is *not* toggled, but flip-flop WC is set again.

One can readily see, therefore, that for an uninterrupted sequence of zeros pattern select flip-flop WC changes state at the end of each bit frame period, but write flip-flop WT changes state only at the end of every other bit frame period for producing transitions on the record carrier commensurate with a waveform requiring one-half wave at ¼-bit frame frequency for *two* sequential zeros.

Next it may be assumed that an odd number of zeros has been recorded by the time flip-flop PA0 holds a "one" (PA0=1). This, for example, is the case during the period marked (0) in FIG. 3. Pattern select flip-flop WC is, therefore, set. If, (as is assumed in FIG. a zero preceded that one, flip-flop WC must have been reset during that preceding period, so that at the end thereof, a clock pulse for the flip-flop WT is *not* produced at the beginning of the bit frame during which flip-flop PA0 is presumed to hold a "one." Now, PA0 is true, so that the "one" is recorded by placing a transition at the *center* of that bit frame period commensurate with the term WC·PA0·DCENT of the equation given above as being realized by the clock formation gate 16.

In case additional "ones" succeed immediately, WC·PA0·D CENT turns true for each following bit frame period. The resulting toggling of write flip-flop WT and the corresponding placement of transitions on carrier 10 is equivalent to recording a wave pattern of half-bit frame frequency, consonant with the general rule for recording sequences of "ones." But the set state of flip-flop WC represents the fact that such a sequence of "ones" is not phase coherently recorded with bit frame boundaries.

Commensurate with the modulo-two counting process provided by the pattern select flip-flop WC, the flip-flop WC is reset after an even number of zeros has been recorded which concurs with placement of a transition at the end of the bit frame. If, in such a situation, the next bit held in PA0 is a "one," PA0·$\overline{\text{WC}}$·DEND turns true and flip-flop WT changes state for placement of a transition at the end of that bit frame period. For additional ones, transitions are placed at the end of each such bit frame period, again commensurate with recording of waves of half-bit frame frequency. Thus, when flip-flop WC is in the reset state, sequential ones *are* phase coherently recorded with the bit frame boundaries.

Sequences of "ones" are thus recorded always by waves of half-bit frame frequency, but the phase position of such wave train relative to the bit frame boundaries differ by half a bit frame period, depending on whether the number of previously recorded zeros is odd or even. It will be appreciated further that the recording of half-waves of ⅓-bit frame frequency results from the particular operation of these components, producing a transition at the end (middle) of a bit frame after a transition was produced in the middle (beginning) of the preceding bit frame for two dissimilar bits *and* if the odd-even counter WC is *set*.

From a different point of view, it can be concluded that a complete half-wave of ¼-bit frame frequency is recorded for pairs of zeros on prior even number zero counts; a half-wave of ⅓-bit frame frequency is recorded for two dissimilar pairs if the zero count signals an odd number of counts during the second bit frame period of the two-bit frame periods involved in the recording of such a half-wave. This is so, as for a 0,1 bit sequence a transition is placed on the leading bit frame boundary of the two-bit frames involved *only* if the zero count state *after* that leading boundary but prior to counting the "zero" of the 0,1 pattern represents an even count state of zeros; the zero of the 0,1 bit pair bringing the count state to an odd number and the "one" must be recorded as a midframe transition. A 1,0 pattern produces a half-wave of one-third frame rate frequency only on odd zero counts so that the one is recorded as midframe transition. In either case the zero count signals an odd count during the second one of the two bit frames involved for recording a pair of dissimilar bits.

A half-wave of half-bit bit frame frequency oscillation is recorded for two "ones" (a full wave for three ones, etc.) on odd prior zero counts, while a half-wave of that frequency records a single one (a full wave for two ones, etc.) on even prior counts. This may seem to establish ambiguity but in the recorded signal train the two cases differ by absence or presence of prior and of succeeding half-waves of one-third bit frame period and, as will be explained below, leads to the correct number of "ones" within a sequence of half-bit frame frequency half-waves.

It will be appreciated that a different, but fully equivalent pattern could be recorded if "even" be substituted for "odd" and vice versa. From point of view of control this may simply mean that flip-flop WC is initially in the set state rather than in the reset state.

It will now be described that the recording process commences properly. Whenever a write operation is desired, the control logic of which the write control circuit illustrated is a part, issues a signal WI. This means that at termination of a write operation, WI turns false. Therefore, at the end of the preceding write or record operation, the ERASE inputs for flip-flops PA0, PB, WB, WT, WC and DC0 through DC3 turned false to reset these flip-flops. Concurrently thereto the MARK inputs of flip-flops PA2 and PA1 turn false to set these flip-flops. As a new recording operation is about to take place, these flip-flops are in these states and the turning true of WI does not change the states.

The WI signal sets the flip-flop EE and, therefore, prepares the metering circuit 20 for operation. Prior to WI turning true, there is no counting operation, and, accordingly, the counter is in count state zero. As soon as EE is set, the counter 20 begins to count pulses OSCW to meter bit frame periods. As write flip-flop WT is reset it establishes a particular magnetization direction at the beginning of the recording. As flip-flop WC is reset the modulo-two zero counting commences with the condition that an even number of zeros (namely, none) has been recorded. This, however, is totally arbitrary, the recording process could begin with WC being set. The flip-flops PA2 and PA1 are in the set state, equivalent to holding a "one" for defining a preamble. Flip-flop PA0 is reset equivalent to holding a "zero."

After the first bit frame period has been counted, DEND turns true, but flip-flop PA0 holds a zero, so that none of the clocking terms for flip-flop WT turn true, the flip-flop does not toggle, but flip-flop WC does, to cause flip-flop WT to change state after the second bit frame period. Sequential zeros are thus recorded in that transitions follow each other at half the bit frame rate, i.e., at every other boundary. The recording of zeros in this manner proceeds as long as a data bit of value "one" is not set into buffer flip-flop PA0, but flip-flop PA0 cannot receive any other bits as long as the shift clock pulses PSHC are not produced. Setting of flip-flop WB is a prerequisite to start the shift clock PSHC. Thus, prior to the first data bit of value "one" the flip-flops of shift register 15 remain in their initial states which is the reason the "zero" held in PA0 can be recorded repeatedly.

The shift clock 22 includes a latching circuit 24 providing a true output signal as enabling signal to gate 23 (through gate 25) only after a data bit of value 1 has been set into flip-flop WB by operation of the external source. The latch remains latched as long as WI=1. WI=0 opens the latch and stops the shift clock. Thus, after the first "one" has been set in flip-flop WB the output of gate 23 turns true at the end of the bit frame period in which the one was asynchronously set into WB, to produce the first shift pulse PSHC. Thereafter circuit 24 latches to continue to provide the shift pulses PSHC independent from the content of flip-flop WB.

It will be appreciated that the selection of the initial state of pattern control flip-flop WC is actually arbitrary as it is uncertain whether the flip-flop is set or reset by the time the first "one" has been set into the buffer WB. Therefore, as the first shift clock PSHC signal clocks the "one" held in PA1 into PA0, flip-flop WC may be in the set state or in the reset state and this first "one" is recorded as a midframe or as an end-frame transition as the case may be. The recording of data proper can thus begin with an odd or with an even number of zeros preceding the data proper, and the preamble "ones" may appear as end-frame or as midframe transitions. Each sequence of data can be thus recorded in this method in two different ways which are absolutely equivalent, but each represents the data unambiguously. The state of flip-flop WC selects which type of sequence is to be used in accordance with its state at the time of the first "one." It will be appreciated more fully later on that recovery of the data is completely independent from this initial selection indeed.

As illustrated in the embodiment of FIG. 3, it is presumed that the two preamble bits of value 1 are preceded by an odd number of zeros so that the first "one" is recorded by a midframe transition, flip-flop WT toggles as $WC \cdot PA0 \cdot DCENT$ turns true. The operation proceeds from there as can be seen from the last two lines of FIG. 3. The last one of the three initial "ones" is the data bit "one" which triggered the shift clock and thereby did set the recording operation into motion beyond the initial zero recording.

We will now proceed to the discussion of the modified circuit, as far as clock gate 16 is concerned. It is emphasized that the recording scheme as described thus far does not require sensing of preceding and/or succeeding bits for control of flip-flop WT. Previous recording events reflect only indirectly in the modulo-two counting process conducted by pattern select flip-flop WC. However, the content of flip-flops PA1 and PB should be taken into account for the recording in order to distort the recorded wave pattern so as to counteract various phenomena such as, for example, readback bit crowding and rise time problems of recording which phenomena become noticeable during readout, in that there is a relative time displacement of sequential readback peaks representing the passage of recorded transitions.

The purpose of a modification for clock circuit 16 is to phase-shift the time of toggling flip-flop WT to offset the time displacement resulting from crowding and for this it is necessary to consider for each recording process the value of the preceding and of the succeeding bit. Bit crowding has the following effect: If any three sequential magnetic transitions are such that the middle one does not occur in the halfway point between the first and the third one, then the readout voltage peak representing that middle transition will appear displaced tending to shorten the longer and lengthen the shorter one of the two periods of time involved as between the first, middle and third transition. This occurs, for example, always when a zero is followed by or succeeds two ones, or when two zeros with no transition at their common frame boundary are followed by a one or when two zeros are followed by two ones.

In accordance with the modified clock circuit 16 bit crowding will be counteracted by artificially making the longer one of two sequential but unequal periods in between transitions still longer, and to shorten the shorter one still further than required by regular metering of placement of transitions. It will be recalled that in the simplified clocking pattern transitions were produced by toggling flip-flop WT on DEND or on DCENT. The modified control will cause toggling to be somewhat earlier or somewhat later (or on time), depending on the bit value pattern involved.

The equation given above for the clock pulses produced by circuit 16 for write flip-flop WT includes a term $\overline{WC} \cdot PA0 \cdot D$END, defining the precise placement of a transition at the end of a bit frame period in case a one is to be recorded, while an odd number of zeros has been recorded previously. In the expanded circuit placement of a transition at precisely that point in time will be true only if that "one" is also succeeded by a "one." It should be noted that a "one" is recorded by a transition on the end of a bit frame boundary if for *any* reason there is also a transition at the beginning of that boundary regardless of the value of the previous bit (see, for example, the last four bits in FIG. 3), as obviously the term $WC \cdot \overline{PA0} + \overline{WC} \cdot PA0$ was true at that previous boundary. Hence, if the bit thereafter is likewise a one, the middle one of the three succeeding transitions placed on succeeding bit frame boundaries can be placed precisely on the middle one of the three bit frame boundaries involved as there will be no bit crowding. Thus, the clocking term has to be expanded to read $\overline{WC} \cdot PA1 \cdot PA0 \cdot DEND$.

In case recording of a "one" includes placement of a transition at the trailing bit frame boundary and assuming further that this "one" is succeeded by a zero, then that transition should be recorded somewhat earlier to combat the delay incurred upon reproducing such transition, so that the modified clock circuit 16 includes a term which reads $\overline{WC} \cdot \overline{PA1} \cdot PA0 \cdot DEND \cdot OSCW$. That latter component in the term ensures recording by half an oscillating period earlier.

The gating network 16, in the simplified form mentioned above, is assumed to realize the term $WC \cdot PA0 \cdot DEND$ commensurate with the placement of a transition at the end of a bit frame period in case a "zero" is to be recorded after an odd number of zeros has been recorded previously. The clocking term in that form should be true only if the next bit is likewise a zero. Therefore, the precise placement of a transition at the end of the bit frame time should occur only under the conditions of $WC \cdot \overline{PA1} \cdot \overline{PA0} \cdot DEND$.

In case a "zero" bit is succeeded by a "one" bit and a transition is placed on the boundary between the two bits which occurs only if the zero involved completes an even zero count. Under such conditions a zero-one sequence is indicative that a relatively shorter period between two transitions is about to succeed a longer period, requiring shortening of the shorter one and lengthening of the longer one. Thus, the respective transition under consideration has to be placed somewhat *after* the end of a bit frame period. This requires, therefore, the introduction of an additional flip-flop which is the function of flip-flop PDA. The flip-flop PDA as shown in FIG. 2, is set under the conditions of $WC \cdot \overline{PA0} \cdot PA1$ commensurate with the recording of a zero after an odd number of zeros have been counted, the signal PA1 being indicative of a "one" as a next bit serving as an additional gating signal. The flip-flop is reset at DC3 and clocked at DC2 (which is at the end of the bit frame). It follows, therefore, that the trailing edge of the signal PDA itself occurs somewhat after the end of a bit frame period, and accordingly, signal PDA itself ($PDA \rightarrow \overline{PDA}$) serves as a clocking signal for flip-flop WT, slightly after a bit frame boundary as required.

The third term in the simplified logic circuit 16 is $WC \cdot PA0 \cdot CENT$ commensurate with the placement of a transition in the middle of a frame period for recording of a "one," which occurs only in case an odd number of zeros has been recorded up to that time. The placement of a transition in such a situation precisely in the center is true only if the "one" to be recorded is succeeded as well as preceded by a one, or is preceded as well as succeeded by zeros. Accordingly, for the modified clock the term $WC \cdot PA0 \cdot DCENT$ has to be AND gated additionally in circuit 16 by the condition $PA1 \cdot PB + \overline{PA1} \cdot \overline{PB}$.

Additional clocking terms have to be provided by gate 16 in case the "one" to be recorded is succeeded by a "zero" and preceded by a "one" or vice versa, in the first case the recording is to occur a trifle earlier, in the reverse situation the recording should be slightly delayed. Accordingly, the circuit 16 realizes the term $WC \cdot \overline{PA1} \cdot PA0 \cdot PB \cdot DCENT \cdot OSCW$, for the case the "one" to be recorded by a midframe transition is succeeded by a "zero" and preceded by a "one." If the "one" to be recorded by midframe transition is preceded by a "zero" and succeeded by a "one," recording has to be delayed, and therefore the circuit 16 realizes the term WC·PA1·PA0·$\overline{PB}$·DC2·$\overline{DC3}$ occurring, in fact, slightly later than the exact midpoint of a frame period.

These modifications of the circuit 16 can be provided in a different manner as in different situations such as different record carrier speed, different frequency, different recording material bit crowding may have to be compensated to a different degree so that the correct distorted times for recording have to be different, of course, within the resolution capability of the system as established by the frequency of oscillator 21. Different incremental corrective periods can be metered and derived from the circuit 20 by gating-out suitable states of the several stages incorporated in the bit frame counter 20. 2 Proceeding preliminary to the description of FIG. 4, there is illustrated the circuit for recovering the digital data which have been recorded in the particular QHC recording format previously described. The readout signal generation proper is not part of the present invention. Briefly, the record carrier 10 passes a readout transducer 31 providing readout signals in a form that for each flux reversal or transition passing the transducer a voltage excursion is induced in one or the opposite polarities, depending upon the direction of the flux reversal. A circuit network 32 provides preliminary processing of the readout signal in analog format.

A preferred form of preliminary processing is described in the copending application, Ser. No. 809,586 filed Mar. 24, 1969, of common assignee. The circuit as described in this companion case produces a particular pulse for each transition passing the transducer. The pulses have definite, similar, short durations and steep leading edges. Therefore, nanoseconds purposes of describing the present invention, the content of that application may be regarded as being included in block 32. In addition, however, the circuit 32 may include a pulse-forming network and, therefore, it is presumed that pulses, called RPC, having, for example, a duration of 100 nanoseconds are produced in an output line 33 of circuit 32, each such pulse representing the occurrence of a transition as it was recorded originally with the circuit shown in FIG. 2.

Consider the format of the recording and it appears that after each readout pulse RPC, another pulse can occur either about one bit frame period thereafter, two bit frame periods thereafter, or one and one-half bit frame periods thereafter. In accordance with the operation principle for recovering the QHC recording format, the operation is such that with *each* readout pulse RPC a counter (counter 35, infra) counting oscillator pulses begins to count anew. The oscillator pulses have a frequency which is at least one order of magnitude above the bit rate, to meter particular detection periods of time, in the following also called zone 1, zone 2, zone 3 and zone 4.

The counting process serves to detect in which zone falls the next readout pulse RPC. The zones are metered such that if the next readout pulse falls in zone 1, that pulse is interpreted as noise and is suppressed. If the next readout pulse occurs during zone 2, occurrence is interpreted as having occurred one full bit frame period after the one which started the counter. Zone 2, of course, does not cover an incremental time interval, occurring exactly one bit frame period after readout pulse; zone 2 covers actually approximately 50 percent of a bit frame period as a tolerance period for the next readout pulse. If the next readout pulse does, in fact, occur in zone 2, elapse of a bit frame period between two sequential transitions is recognized and a half-wave of half-bit frame frequency is regarded as having been detected; moreover, the counter starts anew.

A readout pulse may fall into zone 3; that pulse is regarded as having occurred one and one-half bit frame periods after the one which started the counter. If zone 3 elapses without occurrences of a readout pulse, zone 4 commences having basically indefinite duration, and a readout pulse occurring in zone 4 is indicative that two bit frame periods elapsed since the previous readout pulse which started the counter.

After these preliminary remarks, I will proceed to the initial, digital processing of the readout signal RPC. The signal is used to set a flip-flop RPB at the next one of a sequence of oscillating pulses OSC drawn from a high-resolution, high-frequency oscillator. The frequency of the oscillator is comparable with the frequency of the write clock 21 and for all practical purposes, these two oscillators could be the same. The reset input side of flip-flop RPB is permanently enabled. Thus, after a readout pulse RPC has occurred flip-flop RPB is set on the next clock OSC and reset on the next OSC pulse thereafter. Hence, for each readout pulse flip-flop RPB produces an output pulse having duration of one clock pulse period $\overline{OSC}\rightarrow\overline{OSC}$. Flip-flop RPB starts counter 35 which begins to count pulses OSC. A count number decoding and gating network 36 is connected to the counter 35 to provide enabling signals or true signals commensurate with the several zones to be metered.

As can be seen in FIG. 4*a*, count number decoder and gating circuit 36 provides the zoning signal Z1 for a particular plurality of low-valued counting numbers. For the last oscillator period during zone 1, circuit 36 provides a signal which can be designated "end-of-zone 1" or EZ1 for short. Zone 2 (signal Z2) follows zone 1 after a gap of one clock pulse period. The circuit 36 provides an "end-of-zone 2" signal EZ2 during the last oscillator period of zone 2. Zone signal Z3 follows directly Z2 and is in turn followed by a zoning signal Z4.

It should be appreciated that the count number decoder-gating circuit 36 produces also during appropriate complementary signals $\overline{Z1}$, etc. Moreover, additional timing signals can be generated in a conventional manner by the counter-decoder combination 35–36, to be used where needed. Commensurate with the timing requirement of the system, signals Z2, Z3 and Z4 cover the periods during which respectively a readout pulse occurring one, one and a half or two bit frame periods after the one which started the counter, will in fact occur.

The set, elapsed J, input side of flip-flop RPB is initially under control of a gate 34 through which the readout pulse RPC must pass and receiving as an enabling signal the signal $\overline{Z1}$. This means that during zone 1, i.e., for the duration of signal Z1, flip-flop RPB does not accept readout signals RPC. The purpose thereof is to suppress spurious signals, as a readout signal occurring during that period must be a noise spike which was improperly recognized by circuit 32 as a readout signal. After this reject period has elapsed, flip-flop RPB can accept a readout signal RPC during zone 2, zone 3 or zone 4 signals, and if this flip-flop so accepts a readout signal, it resets immediately counter 35 which, in turn, causes gate 36 to go back to zone 1, etc.

Commensurate with the timing logic, there is provided a plurality of flip-flops which detect whether, in fact, a read pulse RPB occurs about a full bit frame period, about one and one-half frame period, or about two bit frame periods after the previous read pulse RPB. A flip-flop RD 12 has its J input AND gated by a zone 2 signal Z2, and therefore is set when a RPB pulse occurs during zone 2. Flip-flop RD 12 thus serves for the detection of recorded high-frequency components, i.e., of half-waves of *half*-bit frame frequency. The flip-flop RDO 4 has its J input zone 4 gated by signal 24 and is therefore, set when a pulse RPB occurs in zone 4. Thus, flip-flop RDO 4 serves for the detection of recorded low-frequency components, i.e., of half-waves having *quarter*-bit frame frequency.

For the detection of (quarter-bit midfrequency component (one-third bit frame frequency), i.e., for a RPB signal following a previous read signal RPB by a delay of approximately one and one-half bit frame period (zone 3), there are provided two flip-flops RD 13 and RDO 3. The reason for using two detector flip-flops has to do with the interpretation of such a signal. A low-frequency (quarter-bit frame) component always means *two* sequential "zeros" so that the set state of flip-flop RDO 4 is commensurate with the detection of two zeros. The flip-flop RD 12 is set only in interpretation of *one* bit of value "one." In other words, there is no ambiguity between bit value association and high- or low-frequency components in the readout signal, as far as rate of occurrence of RPB is concerned.

On the other hand, a recording signal having midfrequency, i.e., a delay of one and one-half bit frame period in between two detected transitions is not, per se, *un*ambiguous, Such period between detected transitions was recorded when a "-zero" followed by a "one," or when a "one" followed by a "-zero," depending upon the previous history of the readout. Moreover, half of all midfrequency components actually represent two bits, the other half only one bit, to even out the total bit count.

The two flip-flops RD 13 and RDO 3 each have the respective J input and AND gated by the zone 3 signal as such a midfrequency component is represented by a RPB signal occurring during zone 3. A control and selector flip-flop RZ3 controls the selection of flip-flop RDO 3 and RD 13 for receiving a midfrequency representing read signal RPB, whereby the set output (RZ3=1) enables the J input of flip-flop RDO 3, the reset output ($\overline{RZ3}$=1) enables the J input of flip-flop RD 13.

The flip-flop RZ3 is to some extent the read circuit correlative to the write pattern control flip-flop WC in the write circuit. In essence, then, flip-flop RZ3 is a modulo-two counter for detected midfrequency components, but within the system this operates as a modulo-two counting process for zeros as well, if one considers the fact that such counting process is not affected if low-frequency read signals are detected in between two midfrequency components as two zeros, per each low-frequency component does not change the modulo-two counting process. This equivalence of odd-even counting of zeros as well as of midfrequency components aids in the understanding of the correspondence in operation of flip-flop WC and RZ3.

The character of flip-flop RZ3 as a counter is evidenced by the fact that it is controlled as a toggle flip-flop as far as its JK inputs are concerned, i.e., they receive the same inputs from an AND-gate 37, which receives also the zoning signal Z3 for gating and the RPB signal for detection. The operation of flip-flop RZ3 is synchronized with the placement of midfrequency components during the record process and is, in fact, an odd-even counting process for midfrequency components as well as for zeros as can be seen from the following.

The philosophy behind this decoding scheme is the following: Midfrequency components are not needed within a data sequence if one or more "ones" follow an even number prior zeros such that a high-frequency half-wave (pattern of FIG. 1*d*) can be appended to a low-frequency half-wave, phase coherently with the bit frame boundaries. An odd zero is represented by a leading boundary transition. A subsequent "one" disturbs coherency with phase boundaries, as it requires a midframe transition which results in the midfrequency component. The first midfrequency component therefore, disturbs the coherency of the wave pattern with the boundaries and the next midfrequency component thereafter restores that coherency.

It is presumed that *any* recording commences with zeros. Thus, the recording begins always with phase coherent placement of transitions on bit frame boundaries. Therefore, the very first midfrequency component must result from a boundary transition, followed by a midfrequency transition in the next frame thereafter. Thus, the very first midfrequency component detected *must* be in representation of a "zero-one" bit pair, and the next midfrequency component must be in representation of a "one-zero" bit pair accordingly. Simply because if the first midfrequency component has resulted from the fact that the *trailing* one of the transition pairs is in the middle of a frame, then the next midfrequency component must be such that its *leading* transition is in the middle of a frame.

It will be recalled that each recording is preceded by a plurality of zeros. One could choose a definite number of zeros but the circuit is designed to permit an indefinite number of "-zeros" to precede the first three "ones," whereby it is unimportant whether this number of initial "zeros" is odd or even. The first "one" of the preamble is recorded as a midfrequency component (as shown in FIG. 3) if the number of preceding "-zeros" during the waiting period is odd, as that causes placement of a midframe transition.

On the other hand, if the first recorded "one" had been preceded by an even number of zeros, the "ones" would be represented by sequential boundary transitions, and the bit frame for the next zero thereafter would begin also with a boundary transition. It is thus true, right from the beginning, that the first midfrequency component to be detected whenever occurring is in fact representation of a 0,1 and the zero thereof is *preceded* by an *even* number of zeros, equivalent now to an even number of prior midfrequency components in order to commence properly.

It follows from the foregoing that sequential components represent *always alternating* (0,1) and (1,0) bit pair patterns beginning with a 0,1 configuration. Flip-flop RZ3 then keeps track of this alteration; its reset state indicates that the next midfrequency component *must* represent a (0,1) configuration—its set state indicates that the next midfrequency component *must* be a (1,0) configuration.

Flip-flop RZ3 is force-reset initially at the first long frequency component as evidenced by the signal $\overline{Z4}$ at the ERASE input. The flip-flop RZ3 is controlled consistently in accordance with the rule 3 the flip-flop is in the reset state after an even number of zeros and after an even number of midfrequency component as equivalent situations; the flip-flop is set for odd counts. The (first) midfrequency component itself includes a zero which adds *a* zero to the previous even count. *After* the midfrequency component there is an odd number midfrequency component count (and an odd number zero count) established by the fact that the component itself toggles flip-flop RZ3 to the set state. It follows from the foregoing that during readout process a forced DC resetting of the flip-flop RZ3 on low-frequency readout pulse rates does not disturb this state of the flip-flop RZ3 simply because any low-frequency components in the readout pulse sequence can occur only after an even number of zeros and (zero) midfrequency components has been added to the total count, the flip-flop RZ3 then being already in the reset state in representation of an even count so that nothing is changed. It is emphasized, however, that this operates also as partial self-correction of read errors, forcing the system in synchronism to properly distinguish midframe transitions from boundary transitions.

Flip-flop RZ3 is in the reset state when a midfrequency component represented by a readout signal RPB during zone 3 is encountered, and that signal is representative of both, an additional "zero" and a "one." The "one" of this bit pair is stored in the flip-flop RD 13, whose set, or J, input gate is enabled during the reset state of flip-flop RZ3. Therefore, the flip-flop RD 13 is set on "ones" following directly an odd number of zeros (while prior thereto there was an even number of zeros, the midfrequency component now detected being representative of an additional zero and of a "one" following thereafter). The "zero" included in the midfrequency component is detected indirectly as will be described below in that the failure of a RPB pulse to appear during zone 2 automatically results in the production of a zero as long as flip-flop RZ 3 is in the reset state. This will be elaborated below.

Flip-flop RZ3 stays the set state until the next midfrequency component is encountered in representation of a "one" followed by a "zero," which means a zero after an odd number of zeros has occurred previously. Therefore, a signal RPB representing such a midfrequency component is set into flip-flop RDO3 whose J input gate is enabled when flip-flop RZ3 is set. This pulse RPB is in particular set into the flip-flop RDO3 as representation of a "zero" now detected. The "one" included in this midfrequency component has already been detected, as will be elaborated below.

It follows, therefore, that flip-flop RD 12 is set by half-bit frame frequency components in representation of at least one "one," possibly included in a sequence of "ones." Flip-flop RDO4 is set by low-frequency components in representation of an even number of zeros. Flip-flop RD 13 is set upon a "one" following an odd number of zeros, as far as total recording is concerned, with a zero directly preceding the particular one so detected. The flip-flop RDO3 is set upon a "zero" following a "one," which situation can occur only if there was an odd number of zeros recorded prior to the "zero" included in the particular midfrequency component represented by an RPB signal during zone 3.

In the foregoing it has been described how the several signals RPB following each other by different delays are gated into one of the four flip-flops, RDO3, RDO4, RD 12 and RD 13, serving as temporary storage.

The description of the resetting of these flip-flops RDO3, RDO4, RD 12 and RD 13 has to be deferred until the description of data train assembly. A data train must be composed from the content of those flip-flops, essentially at bit rate. The bit rate, however, has yet to be established. In the following it will be described, first, how the data clock pulse is recovered from the pulse train RPB, and, subsequently, it will be described how the thus recovered clock pulse is used to establish the data train proper.

It has to be realized that the readout signal train is self-clocking, in spite of the fact that there are less transitions, i.e., less pulses RPC or RPB than bits, but, the chosen format still includes implicit its own data clock (bit rate) recording. However, unlike conventional self-clocking codes, such as Manchester or frequency doubling, or others, the recovering of the clock pulse and bit rate is more difficult here because clock pulses cannot exclusively be derived from the RPB pulses, there are not enough of them. For example, a sequence of zeros produces only half the number of RPB signals plus one. Moreover, not all RPB pulses represent a transition boundary. It will be noticed further that counter 35 is reset with each signal RPB, and there is no comparison in the timing thereof, with an absolute sequence of timed referenced pulses, waves or signals.

Two flip-flops RDC1 and RDC2 are provided for the recovery of the clock pulse as inherently included in the recording. Each of them produces clock pulses under different circumstances. The principal data clock pulse generator is flip-flop RDC1. The flip-flop produces a clock pulse at the end of each zone 1 pulse (J input is EZ1) and stays in the set state for four oscillation pulses OSC thereafter. The system is constructed such that the reset pulses for flip-flop RDC1 are produced always periodically after four oscillating pulses OSC, and the setting of flip-flop RDC1 is appropriately synchronized therewith through pulse EZ1 occurring at the end of zone 1. Therefore, flip-flop RDC1, when set, stays set from the end of zone 1 for four oscillating pulses thereafter, regardless of the time of occurrence of the next pulse RPB after the end of zone 1.

The reset signal for flip-flop RDC1 is additionally AND gated by AND-gate 39 for a set state of flip-flop RDC1 to serve as reset signal for flip-flops RDO3, RDO4, RD 13, as well as for a flip-flop RDL to be introduced later. It can, therefore, be seen that a clock pulse RDC1 is reproduced from each read pulse RPB. *That* read pulse *may* have set one of the data flip-flops now being reset.

A pulse produced by circuit RDC1 serves always as a data clock pulse, but the flip-flop RDC1 does not produce "enough" pulses to satisfy the requirement for data clocking because, as stated above, there are less pulses RPB than there are bits. This occurs particularly on low (quarter bit frame)-frequency components while one-half-waves cover two bit frames. Therefore, the "missing" data clock pulses are provided by "substitute data clock" flip-flop RDC2.

The flip-flop RDC2 is set at the end of zone 2, by signal EZ2, provided the respective next pulse RPB has not arrived in zone 2 and does not arrive during the last oscillation period of OSC, i.e., during EZ2. This is evidenced by a gating signal $\overline{RPB}$, as the relation $\overline{RPB}\cdot EZ2$ can be true only if there is (was) no pulse RPB throughout zone 2. This situation in turn arises only if a low- or a midfrequency component is about to be detected. In addition, the J input for flip-flop RDC2 requires for gating the reset state signals from flip-flop RZ3, i.e., the signal $\overline{RZ3}$. The trailing part of a low-frequency component can occur only when RZ3 is reset in representation of an even number count state of zeros as detected thus far; this has been discussed above. Moreover, by gating RDC2 with $\overline{RZ3}$, in fact, only half of all midfrequency components are "used" to establish and synthetize missing clock pulses. A count-to-four counter 38 is connected to the set output side of the flip-flop RDC 2 and counts four clock pulses OSC to reset flip-flop RDC2 four clock pulses after it has been set.

The condition for operation of flip-flop RDC2 for production of substitute data clock pulse can, therefore, be restated as follows: Flip-flop RZ3 is in the reset state, as mentioned above, only after an even number of zeros (and midfrequency components) have been counted. Therefore, substitute data clock flip-flop RDC2 is set only if either a low-frequency signal or an *odd* midfrequency signal is forthcoming, bearing in mind that an odd midfrequency component is representative of a 0,1 bit pair.

The readout clock pulses RDC1 and RDC2 as produced by the flip-flops of like designation together reproduce the clock recording inherent in the recording track. They signal to an external device that data is available. The particular output circuit of the system has two data readout channels RD0 and RD1. Channel RD0 is the output of an OR-gate 42 receiving either the output of an AND-gate 41 which is AND gated by clock pulse RDC1. The output of gate 42 turns true in representation of a directly detected digital "zero." Alternatively, OR-gate 42 receives the output of clock synthetization flip-flop RDC2 whenever produced, i.e., data clock pulses produced by flip-flop RDC2 serve as an implicit *zero* detector in case of *absence* of a read pulse under certain conditions and within specified periods. The channel RD1 is under control of an AND-gate 45, gated by the output of flip-flop RDC1 and providing a pulse in representation of a digital "one." RDC2=1 can never be a "one."

The gating control for the readout signals for external usage will now be described, i.e., in the following it will be described how the several data are, in fact, sequentially clocked out of the system; the timing diagram of FIG. 5 should be consulted.

Assuming first there is a sequence of zeros (see left-hand side of FIG. 5), this means in accordance with the recording pattern that there is a pulse RPB at every other bit frame boundary only. Flip-Flop RDO4 is being set for each of these pulses RPB. Furthermore, it is clear that in such a sequence a *single* read pulse RPB occurring during zone 4 represents *two* "zeros," so that two data clock pulses and two data signals representing zeros have to be produced. Additionally, it has to be considered that any low-frequency component represented by pulses RPB following each other after two bit frames can occur only when flip-flop RZ3 is in the reset state commensurate with an *even* number of prior midfrequency components as counted by modulo-two counter RZ3.

We consider now that two pulses (or more) RPB follow each other at the low-freqency rate. Each pulse starts, as always, zone counter 35. At the end of a zone 2 signal, which occurs prior to the second one of two sequential signals RPB considered flip-flop RDC2 is set in such a situation. Its output pulse has a duration of four oscillation periods and is set into line RDO as a detected zero. For the reason mentioned above, the failure of a pulse RPB to appear prior to the end of a zone 2 signal Z2 while RZ3 being false is directly indicative that in the bit frame period which has just elapsed, a zero had been recorded in accordance with the pattern of FIG. 1*b*.

The next pulse RPB is assumed to occur during zone 4 and, therefore, sets flip-flop RDO4. The same pulse RPB, of course, resets counter 35 and zone counting begins anew. At the end of the zone 1 following that signal RPB, clock RDC1 is set and stays set for four oscillating periods. AND-gate 41 is opened by that clock pulse, and since flip-flop RDO4 is set, a pulse appears in line RDO through OR-gate 42 commensurate with the second zero represented by a sequence of two pulses RPB following each other at the low-frequency rate.

One can see from FIG. 5 that for a train of signals RPB following each other at the low-frequency rate commensurate with a sequence of even numbers of zeros, readout pulses are produced in line RDO in that alternatively a readout pulse is derived from flip-flop DEC1 due to the set state of flip-flop RDO4 at that time, while a second readout pulse is synthetized by flip-flop RDC2 merely by detecting failure of a pulse RPB to appear at frame Therefore, Therefore, the flip-flops RDC1 and RDC2 are alternatively set, each operating at half the bit frame rate, to provide "zero" representing pulses into the line RDO.

It is important to note that each of these clocked out, zero-defining pulses in line RDO appears only some time *after* the trailing boundary of the particular frame holding the respective zero has passed, irrespective of whether the boundary is represented by a transition and readback pulse or not. A zero-representing pulse in gates 41 and 42 is produced by flip-flop RDC1 always (1) if a signal RPB is produced at a frame line boundary *and* (2) if the two preceding bit frames held zeros. The particular zero, clocked out through RDC1–41–42, is the second one of a pair and was held in the bit frame having the boundary transition (pattern of FIG. 1*a*), which resulted in a RPB pulse from which that zero-defining pulse was derived by operation of flip-flops RDO4 and RDC1. The alternative input for OR-gate 42 is derived previously from the second read clock flip-flop RDC2, and is produced if a bit frame period elapses without the arrival of a read signal RPB (pattern 1*b*), provided an even number of zeros have been detected previously. This, then, leads to the *possible* situation of detecting a midfrequency component after one or several low-frequency components have been detected.

A midfrequency component after low-frequency components represents a "zero" followed by a "one." A "zero-one" configuration is represented by a pulse RPB following a pulse RPB at one and one-half frame time (zone 3). The zero incorporated in that combination is clocked out by the synthesized data clock pulse as derived from flip-flop RDC2; (see points (*a*) in FIG. 5); it will be recalled that flip-flop RDC2 provides a data pulse in *all* cases where during the reset state of flip-flop RZ3 an RPB pulse did not occur for about one bit frame period (end of zone 2) after the preceding pulse RPB. This includes the case where a midfrequency component within the meaning described follows a low-frequency component (or a sequence of low-frequency components).

Whenever a pulse RBP occurs one and one-half frame time period after the respective preceding one, i.e., during zone 3, and while flip-flop RZ3 is still in the reset state, a zero defining pulse RDC2 is synthetized in representation of the "zero" included in the 0,1 bit configuration as defined by a midfrequency component on *even* prior midfrequency (and zero) counts. The RPB pulse occurring in zone 3 is set into flip-flop RD 13, as mentioned above, (see (*b*) in FIG. 5). At the end of zone 1 succeeding that latter RPB pulse a normal data pulse clock is produced by flip-flop RDC1, (see (*c*) in FIG. 5). This pulse RDC1 now finds gate 45 open as flip-flop RD 13 is set. Thus, a "one" is set into line RD1. Concurrently with the RPB pulse as discussed, the flip-flop RZ3 is set, establishing odd midfrequency component count so that the next midfrequency component whenever occurring, can be switched into flip-flop RDO3.

The example of FIG. 5 shows the first midfrequency component considered and representing 0,1 as being followed by additional "ones." At the time that first "one" is being gated into the line RD1 by RDC1, which is true at the beginning of zone 2, a pulse RPB representing a high-frequency pulse occurs during that zone 2 thereafter and is set into the flip-flop RD 12, (points (*d*) ). It now must be considered that clocking out of a data bit occurs always in the respective next frame period, and flip-flop RD 12 must be prepared for receiving new data in less than a frame period because regular "ones" are defined by RPB pulses occurring at single frame rate. This means that flip-flop RD 12 must be reset at the end of zone 1, succeeding the RPB which caused flip-flop RD 12 to set, as of course, the signal RPB which causes flip-flop RD 12 to set also caused zone counter 35 to start anew. For this reason, flip-flop RD 12 is reset by the EZ1 signal (point (*e*) ). The same signal is used to gate the content of flip-flop RD 12 into the temporary buffer flip-flop RDL (point (*f*) ). Thus, that "one" is available during the approximately concurring clock pulse RDC1 (point (*g*) ), which type of pulse occurs always at the beginning of zone 2. Therefore, the content of flip-flop RDL is an alternative input for AND-gate 45 for clocking "ones" out of the system, and into the line RD 1 at the time of a data clock RDC1.

At the end of a sequence of "ones" (which began with a midfrequency component), a "zero" is defined by another midfrequency component (point (*h*) ), i.e., a RPB pulse following the respective preceding one by a period of one and one-half frame time. It is inherent in this system that such a pulse RPB occurs during the set state of flip-flop RZ3, which, of course, was previously set and remains set during the sequence of "ones," as described. A pulse RPB representing a subsequent midfrequency component succeeding one or several "ones" causes flip-flop RDO3 to be set (point *j*) and its content is gated out at the next clock pulse RDC1, through gates 41–42, as a "zero" (point *k*). Counting flip-flop RZ3 was reset again by the detected midfrequency component.

In summary then, the readback decoding circuit works as follows: Detection of a recorded half-wave of quarter frequency involves response of flip-flop RDO4 to a two-bit frame spacing as between two read pulses. A synthetized "zero"-defining clock pulse RDC2 is produced, first, upon failure of a read pulse to occur prior to the end of zone 2. Subsequently, flip-flop RDO4 is set and its content is gated into channel RDO thereafter as the second "zero" defined by such a low-frequency component. One-third frame rate frequency components *are* detected by gating a read pulse occurring in zone 3 alternatingly into flip-flop RDO3 or into flip-flop RD 13. The state of midfrequency wave counter RZ3 determines and selects the path and thereby determines whether that midfrequency component represents a (1,0) or a (0,1) bit pair configuration. This is based on the fact that if there is a midfrequency component representing a (0,1) bit pair, the next midfrequency component whenever occurring, can only represent a (1,0) bit pair and vice versa.

In case of a (1,0) bit pair, the "one" thereof has already been detected, either by a prior response of RD 13 or by a prior response of RD 12; a "zero"-defining clock pulse RDC2 is not synthetized in this case as RZ3=1 suppresses such production but causes the midfrequency component to be set into RDO3. The set state of flip-flop RDO3 causes subsequent gating of a "zero" into line RDO as the *single* bit actually to be detected by a midfrequency component on *odd* midfrequency count.

On even midfrequency component counts the flip-flop RD 13 is set. A "zero" is synthetized prior to detection of the midfrequency defining RPB-zone 3 pulse, and subsequently a "one" is gated from flip-flop RD 13 into channel RD 1. Thus, occurrence of a midfrequency component on even counts represents actually *two* bits, a "zero" followed by a "one."

The high-frequency components (RPB in zone 2) are all set into RD 12 and transferred to RDL prior clocking into channel RD 1. A high (half frame rate) frequency component occurs for the second one of two "ones" if preceded by a midfrequency transition, the "one" thereof having already been detected. When a "one" or a sequence thereof follows zeros without midfrequency component, then each high-frequency component represents directly a "one" (pattern 1*d*).

It will be appreciated that each of the flip-flops RDO3, RDO4, when set apply their content as a true signal to zero data line RDO at a clock pulse RDC1, while each of the flip-flops RD 13 and RDL, when set, apply their content as a true signal to one data line RD1, also at a clock pulse RDC1; of course, only one of the flip-flops RDO3, RDO4, RD 13 and RDL, is set at any time. At the end of the period of four clock pulses OSC during which the flip-flop RDC1 stays set, data clocking of the respective one of flip-flops RDO3, RDO4, RD 13 and RDL is completed. Thus, at the end of RDC1 a reset signal is applied to all of the flip-flops RDO3, RDO4, RD13 and RDL by gate 39, resetting to concur with resetting of the flip-flop RDC1.

The read operation is, of course, self-terminating in that, for example, after a particular pulse RPB, additional further pulses RPB may now occur, so that the system stays in zone 4 and continues to provide the zone 4 signal; there may be provided a circuit which monitors the persistence of that state to turn the system off.

The invention is not limited to the embodiments described above, but all changes and modifications thereof not constituting departures from the spirit and scope of the invention are intended to be included.

I claim:

1. In a circuit for processing bivalued digital signals for recording;

first means connected to be responsive to digital signals having first value for modulo-two counting digits as represented by the digital signals having the first value, by alternating between first and second count states;

second means providing timing signals in representation of recording of bit frame boundaries and midframe points in time;

third means having first or second state and changing state in response to control signals; and fourth means connected to the third means to provide thereto the control signals, further connected to the first and second means and receiving the digital signals, and providing the control signal in response to the digital signals respectively at bit frame boundary when the digital signal has first value and the first means is in the second state or when the digital signal has second value and the first means is the first state, and at a midframe point when the first means is in the second state and the digital signal has second value.

2. In a circuit as set correspondingly in claim 1, including fifth means which includes the second means and responsive to current, preceding and succeeding digits, to shift the timing of a control signal causing the third means to change state if sequential changes between the first and second states of the third means having unequal duration, the shifting to extend the longer one and to correspondingly shorten the shorter one of the durations.

3. In a system for reproducibly storing digital data on a continuous storage surface, comprising:

first means coupled to the storage surface and responsive to digital data to be stored to provide a particular characteristic on the storage surface on the leading or the trailing digit frame boundary on the surface for a digit of the first value, if a particular characteristic was not or placed on placed on the leading frame boundary of the preceding frame, and for digits of the second values, on the trailing boundary of a digit frame if a particular characteristic was recorded at the beginning boundary of that frame, and in the middle of a digit frame for each digit of the second value if there is no particular characteristics on the leading boundary of that frame; and second means coupled to the surface and responsive to the spacing between sequential particular characteristics and distinguishing the recorded bits in dependence of occurrence of a reproduced particular characteristics a full, one and one-half or two bit frame periods after the respective preceding, reproduced particular characteristics.

second means coupled to the surface and responsive to the spacing between sequential particular characteristics and distinguishing the recorded bits in dependence of occurrence of a reproduced particular characteristics a full, one and one-half or two bit frame periods after the respective preceding, reproduced particular characteristics.

4. In a system for storing digital data having first and second values individually in frames on a movable storage carrier and which includes means for placing transitions on and reproducing such transitions from the carrier, the combination comprising:

first means for selectively controlling the timing and placing of transitions on leading or trailing boundary of a bit frame in response to a digit of the first value, and on both boundaries of a bit frame or the center thereof in response to digits of the second value; and second means responsive to the timing as between reproduced transitions to reproduce the digital signals by distinguishing delays between respective two reproduced transitions by about one, one and one-half or two bit frame periods.

5. In a system as set forth in claim 4, the second means including, means (*a*) for modulo-two counting sequential occurrences of delays of one and a half bit frame periods and providing first and second count state signals;

means (*b*) to provide a first signal in representation of a first digit in response to a delay between reproduced transitions when exceeding the bit frame period during the first count state of the means (*a*) and a second signal in representation of a first digit upon a metered delay of two bit frame periods or of one and a half bit frame periods in the second count state of the means (*a*); and means (*c*) to provide a signal in representation of a second digit in response to a delay between reproduced transitions of one bit frame period or a delay of one and a half bit frame periods in the first count state of the means (*a*).

6. In a system as set forth in claim 4, the first means selecting for recording of digits of the first and second values among two different configurations available for each, and including means (*a*) for modulo-two counting digits of the first value for controlling the particular placement of transitions in response to the digital signals and means (*b*) responsive to the counting of the means (*a*) for alternating between the two configurations for placement of transitions for recording sequential digits of the first value, and for selecting the particular configuration of transitions for digits of the second value in response to the count state of the means (*a*).

7. In a system for sorting signals representing digits having first or second value in sequential digit frames on a magnetic storage carrier;

first means connected to be responsive to digits of the first value and controlling a flux change on a digit frame boundary for every second digit of the first value; and second means connected to be responsive to digits of the second value and connected to the first means to control a flux change on a digit frame boundary if the first or second means provided a flux change on the respective preceding digit frame boundary, and to control a flux change in about the middle of a frame in the absence of providing of a flux change on the preceding digit frame boundary.

8. In a system as set forth in claim 7, including means to shift the providing of the flux change from the middle of a frame to an earlier or later time within the frame if the respective preceding flux change occurred at a shorter period, from the middle of a frame than the respective succeeding flux change is expected to occur.

9. In a system where digital data are recorded on a magnetic storage carrier as flux changes on the center of a bit frame or on one or both bit frame boundaries;

first means responsive to the flux changes to provide a train of pulses representative thereof, the time of a pulse relative to the respective preceding pulse representing the spacing between flux changes on the carrier;

second means responsive to occurrence of a pulse of the train during one of three consecutive periods following the respective preceding pulse of the train; and third means operated by the second means to provide a signal in representation of a digit of the first value where a pulse occurred in the earliest one of the three periods, to provide two signals in representation of two digits of the second value when a pulse occurred in the latest one of the three periods and to provide a digit of the second value when a pulse occurred in the middle one of the three periods and including means to provide an additional digit of the first value for every other pulse occurring in the middle period.

10. In a circuit for converting digital signals having first or second values and represented in NRZ code into a self-clocking code for storage, transmission or the like, with at least one level change to be provided per two digital digits comprising:

first means capable of assuming first and second states and changing state in response to control signals applied to an input of the first means;

timing means provided essentially regularly spaced timing signals at twice the digital data rate of the digital signals, the timing signals comprising alternating first and second signals;

second means responsive to the digital signals and modulo-two counting the digital signals of first value, and alternating between first and second count state accordingly; and third means connected to the timing means to the second means and to the first means and further connected to receive the digital signals, to provide control signals to the input of the first means in response to the first timing signals when the second means is in the first state and the digital signal has second value as well as when the second means is in the second state and the digital signal has first value, and to provide control signals to the input of the first means in response to the second timing signals when the digital signal has the second value and the second means is in the second state.

11. In a system for reproducing digital data;

first means connected to be responsive to recorded half-waves of a first frequency;

second means connected to be responsive to recorded half-waves of a second frequency half the first frequency;

third means connected to be responsive to recorded half-waves of a third frequency in between the first and second frequency;

fourth means connected to the first means to interpret response of the first means as at least one bit of a first value;

fifth means connected to the second means to interpret response of the second means as a pair of bits of a second value; and sixth means connected to be responsive to response of the third means to interpret the response as a pair of dissimilar bits of first and second values.

12. In a system where digital signals have been recorded on a magnetic storage surface by placing a flux reversal at the beginning or the end of a frame boundary in representation of a digital signal of a first one of two values, and by placing a flux reversal in the middle of or on both boundaries of a frame in representation of a digital signal having the second one of the two values, and wherein each reproduced flux reversal is represented by a pulse, the combination comprising:

first means connected to be responsive to a pulse occurring during a first period after the respective preceding pulse;

second means connected to be responsive to a pulse occurring during a second period after the respective preceding pulse, the second period occurring after the first period;

third means connected to be responsive to a pulse occurring during a third period after the respective preceding pulse, the third period occurring after the second period;

fourth means connected to be responsive to the first means to provide digital signals of the second value;

fifth means connected to be responsive to the third means to provide digital signals of the first value; and means selectively operating to alternatingly provide signals of the first and second values in response to sequential responses of the second means.

13. In a circuit for storing sequentially provided digital signals having first and second values, individually in frames on a movable storage carrier;

first means for selectively providing control signals in representation of frame boundaries and of the respective center of the frame;

second means responsive to first bit values and selectively inhibiting and enabling the providing of a control signal by the first means at a frame boundary in respective dependence upon presence and absence of a control signal at the respective preceding frame boundary;

third means responsive to second bit values for selectively enabling the providing of a control signal representing a frame boundary or a frame center in respective dependence upon presence or absence of a frame boundary control signal at the preceding boundary; and means responsive to the control signals to provide storage in representation thereof in the storage carrier.

14. In a system for encoding digital information for recording, transmission or the like:

first means providing for oscillations composed of coherent half-waves of alternating polarity, a half-wave selectively having first, secorfd or third frequency; and means operating the first means for obtaining the oscillations, including, second means responsive to the immediately preceding providing of a half-wave of first or third frequency, to selectively provide a half-wave of first frequency in representation of a pair of similar sequential digits of second value, a half-wave of third frequency, in representation of a single digit of first value, or a half-wave of second frequency in representation of a pair of sequential dissimilar digits, the first one having second value, third means responsive to the immediately preceding providing of a half-wave of second frequency in representation of two dissimilar digits, the second one having second value to provide a half-wave of first, second or third frequency respectively in representation of two similar digits of second value, of two dissimilar bits, the first one having second value, or of a digit of first value, and fourth means responsive to the immediately preceding providing of a half-wave of the second frequency in representation of two dissimilar digits, the second one thereof having first value, to provide a half-wave of second or third frequency respectively in representation of a bit of second or first value.

15. In a circuit for processing digital signals for recording on a magnetic storage surface by placing flux reversals thereon, the spacing between sequential flux reversals being of digital significance, the combination comprising:

first means disposed in relation to the storage surface to provide thereto magnetization including the controlled placement of flux reversals;

second means connected to the first means and responsive to the digital signals to be recorded for controlling the placement of flux reversals by the first means;

timing means included in the second means to control the timing of the placement in representation of the digits represented by the digital signals so that a difference in the delays between any two sequential transitions so placed being of digital significance; and means responsive to the digital signals to distort the timing as provided by operation of the second means to increase the amount of inequality as between two unequal, immediately succeeding delays as respectively defined between sequential pairs of reversals.

16. In a system for recording digital data having first or second digit values on a magnetic storage surface comprising:

first means operating in response to production of a flux reversal on a bit frame boundary to selectively provide a flux reversal on the next bit frame boundary in response to a digit of first value, in the middle of frame succeeding the next bit frame boundary in response to a digit of second value and a succeeding digit of the first value, and on the bit frame boundary thereafter in response to two sequential digits of the second value; and second means included in the first means and operating in response to production of a flux reversal in the middle of a frame to selectively provide a flux reversal in the middle of the next frame in response to a digit of the first value, and on the end boundary of the next frame in response to a digit of the second value.

* * * * *